United States Patent Office 3,089,231
Patented May 14, 1963

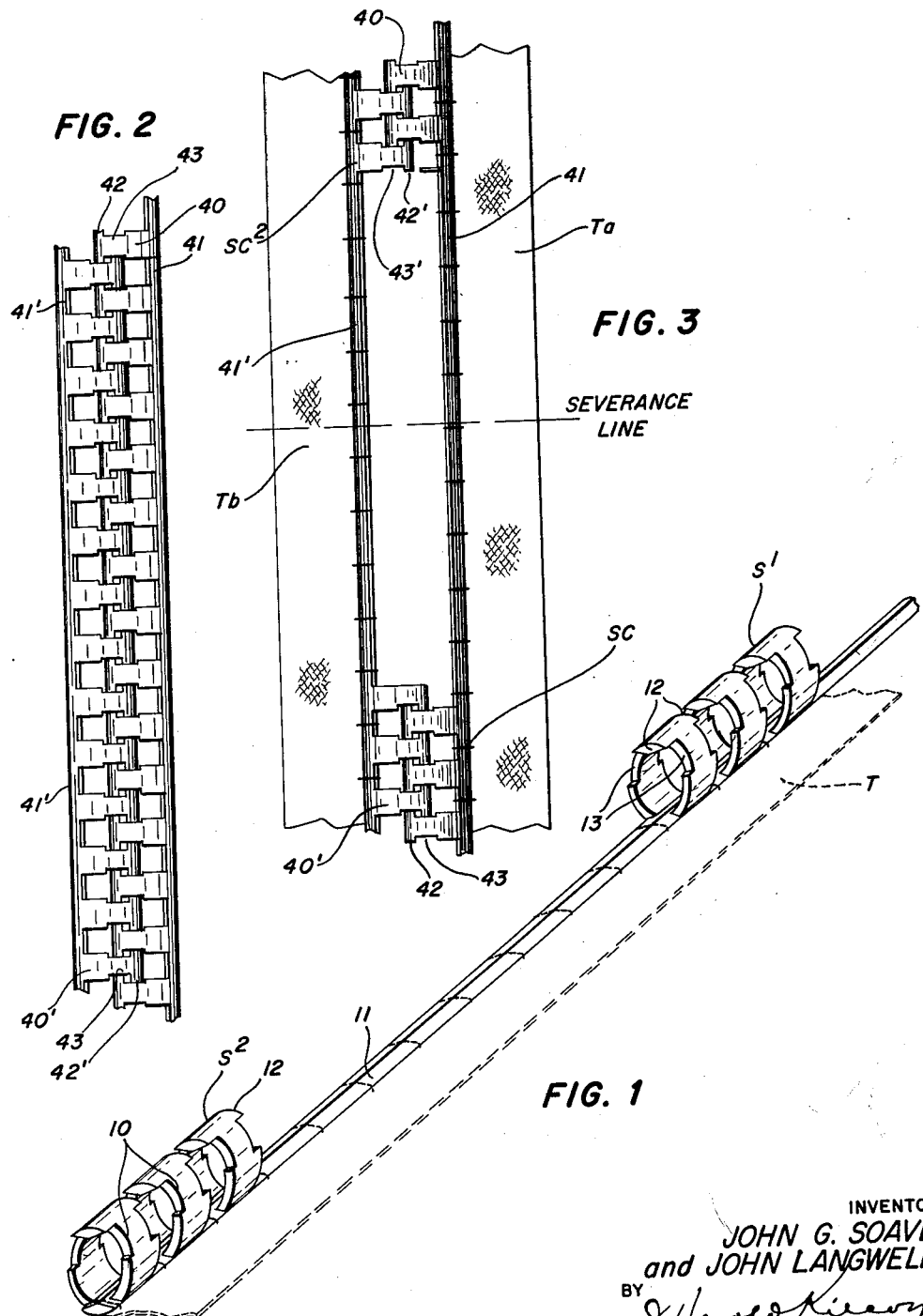

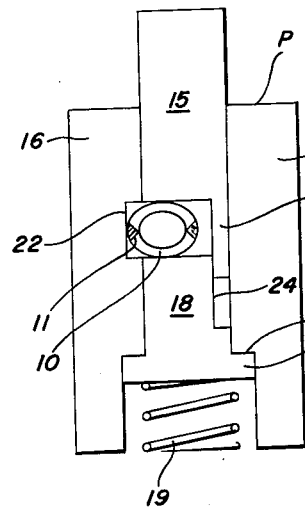
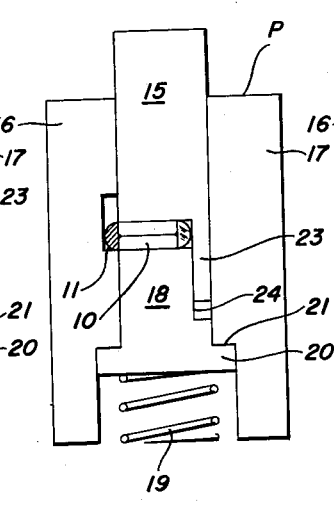
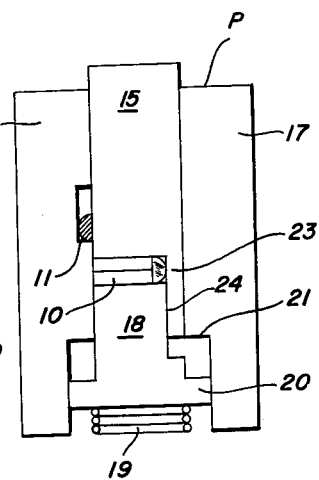
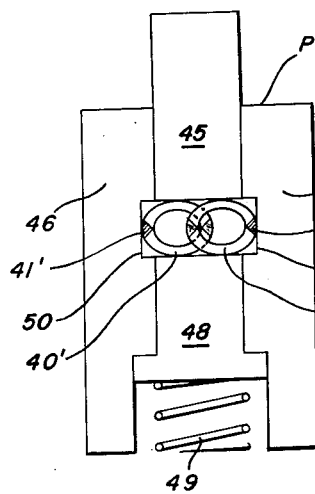
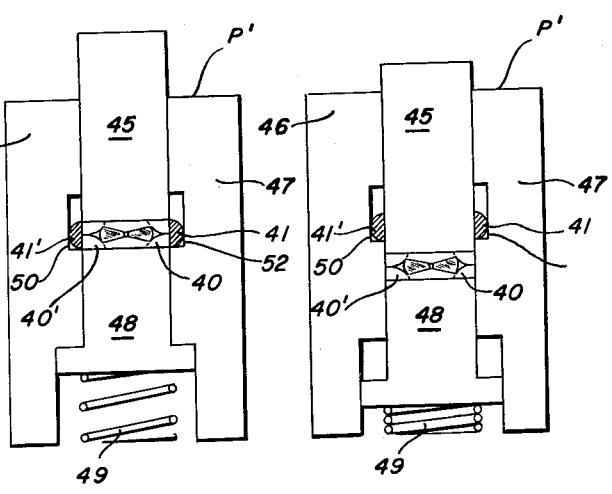

3,089,231
SLIDE FASTENER MANUFACTURE
John G. Soave, Long Island City, and John D. Langwell, Freeport, N.Y., assignors to Waldes Kohinoor, Inc., Long Island City, N.Y., a corporation of New York
Filed Dec. 30, 1960, Ser. No. 79,732
8 Claims. (Cl. 29—410)

This invention relates to improvements in slide fastener manufacture and more particularly to the manufacture of individual plastic slide fasteners or so-called zippers provided with element-free tape extensions at one or both ends thereof from continuous stringers or chains of plastic fastener elements and similarly continuous flexible, usually fabric, carrying tapes.

While not limited thereto, the invention will be disclosed in connection with the manufacture of plastic slide fasteners from plastic fastener stringer or chain and tape components, wherein the plastic stringer or chain component is cut or otherwise fashioned from a continuous plastic tube in such a way as to form therefrom a multiplicity of parallelly arranged, ring-like interlocking fastener elements having sidewardly directed edge prongs and adjacent recesses, which elements are connected to one another at their relatively rear peripheral portion by an integral, longitudinally extending rib constituted by a retained portion of the original tube. Plastic slide fasteners or zippers employing a stringer formed as aforesaid may then be produced by attaching the stringer, as by sewing, to an edge of its carrying tape and thereupon two such stringers and their tapes are connected by a slider. It is of course also possible to vary this procedure somewhat by first forming a fastener or zipper chain as by meshing the oppositely arranged coupling elements of a pair of so-formed, oppositely disposed stringers and thereupon sewing the chain to one and then the other, or simultaneously to both, of their carrying tapes, the latter procedure having the advantage of avoiding any misalignment of the companion stringers making up a fastener.

To produce plastic slide fasteners as aforesaid in quantity, it was of course well known progressively to assemble and secure as by sewing a long continuous stringer or chain strip to a correspondingly long, continuous length of carrying tape or two such tapes, and thereupon to cut off the zipper lengths therefrom. However, the formation of element-free tape extensions, with which finished plastic slide fasteners are usually provided, on each said slide-fastener or zipper length being so produced introduced difficulties in attainment. According to the prior practice, a continuous plastic stringer blank or strip while being sewn to its continuous tape was subjected to the action of two knives spaced apart a distance at least twice that of the length of one of the element-free tape extensions to be provided at an end of the finished slide fastener or zipper, said knives completely cutting away the portion of stringer strip extending therebetween while the tape feed and sewing operations continue on uninterruptedly.

This cutting-off of small lengths of the plastic strip or blank was thus intimately tied to the operation of sewing same to the tape. This was objectionable in itself inasmuch as the sewing operation involved is one that must be performed with the utmost exactitude, and thus any undue tensioning or slackening of the tape resulting from the strip-cutting operation which takes place during the sewing procedure may affect the required precision thereof to a degree likely to impair the smooth operation of the finished fastener or zipper. Another and in fact the main disadvantage of the prior practice was the difficulty in securing the cut-off endmost portion of the rib which projects beyond the individual elements of the strip or an endmost element itself (in the case of the line of cut being such as to have no projecting rib), because of the inability of the thread to hold thereto. Therefore, the first and last fastener elements of each fastener or zipper length may be somewhat loose and hence free to take on an inclined position likely to cause jamming of the slider which is later assembled thereto to complete the fastener or zipper.

Another difficulty in the prior practice stemming from the same source is that, because of the curl or bend likely to be imparted to the end portions of the cut stringer lengths of plastic-element strips, they have difficulty entering the feed channel of the sewing machine which they must negotiate prior to the sewing operation. Obviously, should but one of the plastic stringers fail properly to move into and through such channel, the latter becomes jammed, such usually necessitating shutdown of the sewing machine until proper feed of the stringers can be resumed.

Stated broadly, an object of the present invention is to overcome the aforementioned objections and disadvantages of the prior methods of manufacturing plastic slide fasteners having element-free extensions through the provision of a improved method which not only insures the continuous, uninterrupted sewing of plastic slide fastener stringers arranged as a long connected strip thereof to a continuously moving tape, but also is effective to provide the finished slide fasteners with element-free tape extensions whose presence facilitates assembly of a slider and the attachment of end stops and/or the securement of the finished slide fastener at its ends to a garment crotch or waistband, for example.

More particularly, this invention has for an important object the provision of a fast and dependable method of manufacturing plastic slide fasteners having element-free tape extensions from continuous plastic stringer and flexible tape components, which is based on the plastic stronger component being in the form of a long strip consisting of a plurality of fastener or zipper stringers of the requisite length, which are spaced from but connected to one another by connecting ribs constituting integral extensions of the ribs of the stringers themselves, and which are each twice the length of the tape extensions desired on finished slide fasteners, whereupon upon being cut through at their respective mid points to have length corresponding to that of the element-free extensions to be provided on the adjacent ends of each two of the finished slide fasteners being produced.

Yet another important object of the invention is the provision of a fast and dependable method of producing plastic slide fasteners having element-free extensions at their respective ends from a long continuous plastic strip consisting of a multiplicity of uniformly spaced plastic fastener elements connected together by an integral rib extending the length of said strip, assembled on a correspondingly long continuous strip of flexible tape adapted to form the carrier for said plastic fastener elements, and which includes as an initial step thereof the removal of the plastic fastener elements from the rib thereof throughout the length portions of the strip which corresponds to the length and placement of the element-free portions between each two adjacent slide fasteners to be formed by said strip and tape assembled as aforesaid, with the result that the spacing between each said two adjacent slide fasteners is determined by the length of the retained rib portion extending therebetween and furthermore that the tape portions disposed between said each two adjacent slide fasteners are stiffened by the retained rib portion.

A further object of the invention is the provision of a plastic slide fastener having element-free extensions at its opposite ends as results from the practice of the herein provided method, i.e. a plastic slide fastener characterized by the continuous rib which connects the individual plastic fastener elements being extended for the lengths of the element-free extensions, thereby to serve as a stiffening bead or cord and also as a slider tape-edge track.

The above and other objects and advantages of the instant invention will appear from the following detailed description thereof, in which reference is had to the accompanying drawings, wherein:

FIG. 1 is a foreshortened perspective view of a continuous plastic fastener strip in readiness for assembly to a continuous stringer tape shown in broken lines, the view illustrating the web or rib which connects the individual fastener elements of the adjacent individual fastener-stringer lengths being continued between said adjacent lengths, for the purpose of cooperating with said tape in providing an element-free portion between the final slide fastener or zipper lengths, according to the invention;

FIG. 2 is a plan view illustrative of an indeterminate length of plastic slide fastener chain formed by two plastic tubes having ring-form interlocking fastener elements cut or struck therefrom and which are shown as interengaged, the view illustrating the chain prior to the removal according to the instant invention of certain of said elements from the connecting rib portion thereof as will form an element-free portion as in FIG. 1;

FIG. 3 is a view similar to FIG. 2, illustrating the chain following removal of certain fastener elements to form an element-free portion, the view further illustrating the chain as being secured (sewn) to continuous companion tapes and indicating the line of severance between two adjacent lengths of chain and tape which ultimately separates the chain-on-tape assembly into individual slide fasteners or zippers having element-free tape extensions;

FIGS. 4, 5 and 6 are schematic views of a preferred form of punch mechanism employed to remove certain fastener elements from the integral connecting rib of the starting stringer blank, as results in the FIG. 1 form of stringer strip, said view showing the punch mechanism in three progressive operation positions; and FIGS. 7, 8 and 9 are views similar to FIGS. 4, 5 and 6 but illustrating a form of punch mechanism employed for the removal of fastener elements simultaneously from two stringers interconnected to form a continuous fastener chain, as in FIG. 2.

Referring to the drawings in detail, the plastic stringer strip shown in FIG. 1 for purposes of illustration consists of longitudinally spaced but interconnected series of individual slide fastener or zipper stringers $S^1$ and $S^2$, each including a plurality of ring-like fastener elements 10 which are connected in parallel relation by an integral, longitudinal rib 11 extending between their relatively rear attaching portions and whose opposite coupling portions are formed as coupling heads having side-edge locking prongs 12 and adjacent recesses 13, said prongs and recesses being adapted to mutually interlock with similar but oppositely disposed recesses and prongs, respectively, of the oppositely disposed fastener elements of a companion plastic stringer (the latter is not shown in FIG. 1 but will correspond to the left-side stringer strip shown in FIG. 3, for example). The connection between said individual stringers $S^1$ and $S^2$ is provided by a continuation or extension portion of the same rib 11 which connects the plurality of fastener elements 10 of each said stringer and thus all of the individual or fastener-length stringers making up a single stringer strip are integrally connected by a rib formed of the same relatively stiff plastic material as that from which the individual fastener elements are fashioned.

Preferably, a plastic stringer strip made up of the individual stringers $S^1$, $S^2$, etc. spaced but interconnected by a rib 11, as in FIG. 1, will be fashioned from a plastic, initially continuous tube from which the ring-form fastener elements with their locking prongs and recess are cut at regularly spaced small distances corresponding to the so-called pitch distance of the elements called for by the particular fastener design, the so-cut tube being hereinafter referred to as a stringer or stringer-strip blank. Of course, it is to be understood that the invention is not limited to the formation of the plastic stringer-strip blanks from plastic tubing as aforesaid, since plastic stringer-strip blanks compatible with the invention may be otherwise formed. Again, even when formed from plastic tubing as aforesaid, other shapes and forms of interlocking fastener elements and/or of coupling heads may be utilized.

Assuming that the plastic stringer-strip blank will be formed from plastic tubing cut to provide ring-like and regularly spaced fastener elements as illustrated, it is a feature of the invention not only that the integral rib connections between the fastener-length stringers $S^1$, $S^2$, etc. thereof are provided by removing a plurality of the fastener elements from the rib which connects them at spaced locations along the length of the stringer blank, as results in the provision of said fastener lengths, but also in the removal of that number of fastener elements at each such location as provides spacing between said fastener length stringers which is equal to the length of the element-free tape extensions desired on the ends of the finished slide fasteners. Thus, if a particular run or order calls for 8" slide fasteners having ¾" element-free tape extensions at the ends thereof, fastener elements in number yielding a 1½" element-free rib length between every 8" length of stringer will be removed.

Element removal as aforesaid is readily achieved by feeding a stringer strip blank, as such comes from the apparatus which blanks out the rib-connected ring-like fastener elements from a plastic tube, through punch mechanism of the type illustrated in FIGS. 4–6, inclusive, it being understood that such mechanism possesses a working-length dimension making it effective to remove in one cycle of operation the number of elements making up 1½" of rib length. As will be seen from a comparison of said FIGS. 4, 5 and 6, the punch is also of a type which flattens the ring-like fastener elements which are to be removed prior to severing same from the rib which initially connects same.

More particularly, the aforesaid punch mechanism, which is generally designated P, comprises a punch element 15 mounted for vertical reciprocatory travel between upright side guides 16, 17 toward and away from a yieldable die block or pad 18 mounted for limited vertical yielding movement in said side guides and which is backed up by a coil spring 19 arranged normally to bias the die block to its raised position in which it is stopped by engagement of its enlarged base flange 20 against the upper-end edges of the slideway enlargement 21 in which said base flange operates.

Preferably, the aforesaid guide 16 in its side face along which the punch element 15 travels is provided with an offset recess 22 which is adapted to accommodate the rib 11 of the length portion of the stringer strip from which the fastener elements are to be removed during the working stroke of the punch element 15. Also, the cutting edges formed on said punch element 15 extend transversely away from the side of the punch which moves past said recess for a distance which is somewhat greater than the external diameter of the fastener element so that there is provided adequate space for the increased width of said fastener elements when flattened transversely as in FIG. 5. Preferably, the punch element 15 is formed along its side edge opposite from the aforesaid recess 22 with a depending heel portion 23 which operates in a relieved edge portion 24 of the die block 18, said heel portion thus serving to define one side of the stringer-receiving space provided between punch element and yielding die block.

The operation of the above described element-removing punch mechanism, as will be plain from an analysis of each of FIGS. 4-6 in relation to one another, is first to compress and flatten the plurality of ring-like fastener elements 10 positioned in the space between the punch element 15 and the die block 18 and thereafter to completely sever the flattened elements from the rib 11 which previously had connected them and which, during the actual cutting-off action, is accommodated in the side recess 22 provided therefor. It is contemplated that the starting stringer blank will be fed through the aforesaid punch mechanism with a start and stop motion, with the feed increment between each two punch operations being such as to advance the strip a distance equal to the length of the fastener stringer being produced.

In the further practice of the herein method of producing slide fasteners provided with element-free tape extensions, a long plastic stringer strip consisting of a succession of plastic stringers of the required length and being spaced from one another and integrally connected by ribs 11 of the length corresponding to the element-free extension to be provided between the adjacent ends of each two slide fasteners being produced, that is to say, the plastic stringer strip coming from the aforesaid punch mechanism, is assembled and secured to the edge of a continuous carrying tape T by feeding both continuously to a single-needle sewing machine (not shown) which functions to progressively sew both the series of stringer lengths and the ribs extending between said stringer lengths (in addition to extending between the individual fastener elements of said lengths) to an edge of the tape in the usual manner, i.e. by stitches looped over the rib portions extending between individual fastener elements and over the rib portions extending between the fastener stringer lengths $S^1$, $S^2$, etc. Such results in the production of a long length of flexible tape carrying along an edge thereof a corresponding long plastic stringer strip consisting of a series of slide fastener or zipper lengths of plastic stringer which are connected in series relation by ribs, each corresponding to the rib 11 shown in FIG. 1. The aforesaid plastic stringer strip and carrying tape assembly may be stored on rolls as such or the slide fastener or zipper lengths with element-free extensions may be cut therefrom, thereupon to be joined by means of a slider with a companion stringer to make up a finished slide fastener or zipper, or the long strip-form assemblage may be coupled with a similar but oppositely arranged assemblage by assembling the sliders for the individual slide fastener or zipper lengths thereto in well known manner, for example by the practice of the method disclosed and claimed in Langwell Serial No. 34,839, filed June 8, 1960.

According to an alternate method of producing slide fasteners having element-free tape extensions proposed by the present application, a blank of interengaged companion fastener strips, each made from a plastic tube having ring-like fastener elements as described above is employed, rather than a single stringer strip of the type ultimately making up the strip shown in FIG. 1. Such a chain blank as shown in FIG. 2 comprises a first stringer blank made up of regularly spaced, ring-like fastener elements 40 connected by a longitudinal rib 41 and formed with coupling prongs 42 and adjacent recesses 43, all as previously described, and interengaged therewith a companion, oppositely disposed stringer strip consisting of identical but oppositely arranged and staggered fastener elements 40' connected by a longitudinal rib 41' having coupling prongs 42 and adjacent recesses 42'.

A continuous fastener chain blank as aforesaid is prepared for assembly to similarly continuous carrying tapes by removing interengaging fastener elements therefrom at selected locations and for predetermined lengths thereof as converts the blank to a chain having a plurality of interengaged slide fastener or zipper lengths $SC^1$, $SC^2$, etc. connected in series by rib portions 41 and 41' from which the fastener elements have been removed, such rib portions having length corresponding to twice the length of an element-free tape extension to be formed at each end of the finished slide fasteners being produced.

Fastener element removal (FIG. 2) is effected by feeding same through a chain (FIG. 2) is effected by feeding same through a punch mechanism $P^1$ preferably of the type generally shown in FIGS. 7-9 which, incidentally, is similar in design and functioning to that shown in FIGS. 4-6, differing only in that said modified punch mechanism is set up to remove a plurality of the oppositely disposed, interlocked fastener elements of the two stringer strips making up the chain, rather than of but a single stringer strip. More particularly, the aforesaid punch mechanism comprises a vertical punch element 45 mounted to reciprocate between upright side members or guides 46, 47 toward and away from a yieldable die block or pad 48 backed up by a spring 49. In the modified punch, the side members 46, 47 are provided with offset recesses 50, 52, each comparing to the aforesaid punch recess 22, said recesses acting in concert to widen the opening or space between the punch element 45 and the yielding die block 48 into which the plastic chain is fed preliminary to the punch element 45 (which is normally raised) partaking of its lowering or element-removing stroke. Such widening, as will be seen from a comparison of FIGS. 8 and 9 with FIG. 7, is such as to provide for the accommodation of both ribs 41, 41' of the interengaged ring-like fastener elements 40, 40' as the punch element lowers on to said fastener elements, first to flatten same as shown in FIG. 8, and thereupon to cut through the fastener elements engaged by the punch element while leaving intact the rib portions 41, 41' which previously connected said removed elements.

The aforesaid element-removal operation results in a continuous plastic chain corresponding to that illustrated in FIG. 3 and which consists of two oppositely disposed companion stringer strips of slide fastener or zipper lengths $SC^1$ and $SC^2$, of interengaged fastener elements connected in series and spaced by rib portions 41 and 41' having length corresponding to twice the length of the element-free tape extensions to be provided at each end of the finished slide fasteners or zippers being produced. Such a plastic fastener chain is now ready for assembly with its carrying tapes $T^a$ and $T^b$, and assembly is simply achieved by sewing the chain to the adjacent longitudinal edges of the tapes in a two-needle sewing machine which is continuously operated and to which both tapes and chain are continuously fed. The resulting chain-on-tapes assemblage may be stored on rolls, or the sliders for the slide fasteners or stringers of the series thereof may be assembled thereto as by the method according to the aforesaid Langwell application Serial No. 34,839, and the individual finished fasteners or zippers severed therefrom in quantity or as needed.

Without further analysis, it will be appreciated that the aforesaid method or methods of manufacturing plastic slide fasteners or zippers having element-free tape extensions at their ends is not only faster but also much more dependable and certain in its operation than the prior methods, and particularly the most advanced of said prior methods which was based on the operation of intermittently feeding plastic slide fastener stringers or chains thereof, precut to the length of the finished fastener or zipper to be produced, to a continuously moving tape or a companion pair of each tapes. In addition to the referred-to improvements in the method, the practice of the invention yields further advantages in that it produces a plastic slide fastener which utilizes the plastic rib portions extending between the zipper lengths of fastener elements as a tape bead, thus making the conventional bead unnecessary and adding limited stiffness to the element-free extension or end portions of the tape which heretofore were quite limp and hence difficult to handle and manipulate. Such limited stiffness of said element-free end portions of course facilitate assembly of the fastener sliders thereto. The retained plastic rib also provides what might be termed a built-in track on which the flanges of the slider may ride which, being of plastic, is much more durable and resistant to wear than a sewed-on fabric cord or bead, for example.

As many changes could be made in carrying out the above methods and constructions without departing from the scope of the invention, it is intended that all matter contained in the above description or shown in the accompanying drawings shall be interpreted as illustrative and not in a limiting sense.

We claim:

1. In the manufacture of plastic slide fasteners having element-free tape extensions from successive length portions of a continuous plastic stringer blank consisting of a longitudinal row of uniformly spaced plastic fastener elements which are interconnected by a longitudinally extending, continuous plastic rib and a carrying tape therefor, and wherein said fastener elements are secured to an edge of said tape by stitches looped over the rib portions interconnecting said elements, the step of removing fastener elements from the rib at locations along said row and in number as to form said stringer blank into a stringer strip consisting of a succession of slide fastener or zipper lengths of fastener elements spaced by the rib portions remaining after element removal therefrom as aforesaid and which are adapted also to be secured to an edge of said element-free tape extensions by stitches looped thereover.

2. The method step defined in claim 1, wherein element removal is effected progressively along the length of the stringer blank.

3. In the manufacture of plastic slide fasteners having element-free tape extensions from successive length portions thereof a continuous plastic chain blank comprising two interengaged stringer blanks, each consisting of longitudinal rows of uniformly spaced plastic fastener elements which are interconnected by a longitudinally extending plastic rib and a companion pair of carrying tapes therefor, and wherein said interengaged fastener elements are secured to the edges of their respective tapes by stitches looped over the rib portions interconnecting said elements, the step of simultaneously removing interengaged fastener elements from both stringer-blank ribs at locations along said rows and in number as to form said chain blank into a fastener chain consisting of a succession of slide fastener or zipper chain lengths spaced by connecting, laterally spaced rib portions of the stringer blanks which remain after element-removal therefrom as aforesaid, and which are adapted also to be secured to the edges of the respective element-free tape extensions by stitches looped thereover.

4. The method step defined in claim 3, wherein element removal is effected progressively along the length of the chain blank.

5. The herein described method of manufacturing plastic slide fasteners or zippers having element-free tape extensions from continuous plastic stringer strips and similarly continuous flexible carrying tapes, which includes the steps of providing a plastic stringer blank comprising a longitudinal row of uniformly spaced plastic fastener elements which are interconnected by a longitudinally extending, continuous plastic rib, removing fastener elements from the rib at locations along said row and in number as to form said stringer blank into a stringer strip consisting of a series of slide fastener or zipper lengths of fastener elements spaced by the rib portions remaining after element removal therefrom as aforesaid and having length which is double the length of one of said element-free extensions, feeding said stringer strip with a continuous motion on to a continuously moving carrying tape and sewing the stringer-strip rib to the tape in a continuous sewing operation, thereby uniting said strip and tape and providing limited stiffening in the tape portions extending between the slide fastener lengths of said strip.

6. The herein described method of manufacturing plastic slide fasteners having element-free tape extensions from continuous stringer chain and similarly continuous flexible carrying tapes, which includes the steps of providing a plastic chain blank comprising two interengaged stringer blanks, each consisting of longitudinal rows of uniformly spaced plastic fastener elements which are interconnected by a longitudinally extending, continuous plastic rib, removing interengaged fastener elements simultaneously from both stringer-blank ribs at locations along said rows and in number as to form said chain blank into a fastener chain consisting of a series of slide fastener or zipper chain lengths spaced by connecting, laterally spaced rib portions of the stringer blanks which remain after element-removal therefrom as aforesaid and which have length which is double that of one of said element-free tape extensions, feeding said fastener chain with a continuous motion on to a pair of continuously moving carrying tapes, and sewing the fastener chain ribs to the tapes in a continuous sewing operation thereby uniting said chain and tapes and providing limited stiffness in the tape portions extending between the spaced slide fastener chain lengths.

7. For use in manufacturing plastic slide fasteners having element-free tape extensions, an elongated one-piece plastic stringer strip comprising a longitudinal series of slide fastener or zipper lengths of plastic fastener elements and a longitudinally continuous, relatively rigid plastic rib connecting the elements of each of said length together in spaced parallel relationship and also extending between and connecting each two adjacent ones of said fastener lengths, the portions of the rib extending between each two adjacent fastener lengths having length which is double the length of one of the element-free tape extensions of the finished slide fasteners, said stringer strip being adapted to be secured to an edge of a correspondingly elongated fastener tape by stitches looped over both the rib portions which connect the individual fastener elements and said rib portions extending between each two fastener lengths thereof.

8. For use in manufacturing plastic slide fasteners having element-free tape extensions, a plastic fastener chain comprising two interengaged stringer strips, each having elongated one-piece construction and consisting of a longitudinal series of slide fastener or zipper lengths of plastic fastener elements and a longitudinally continuous plastic rib connecting the elements of each said length together in spaced parallel relation and also extending between and connecting each two adjacent ones of said fastener lengths, the portions of the ribs extending between each two adjacent fastener lengths of the stringer strips having length which is double that of the length of one of the element-free tape extensions of the finished slide fastener, said strips being adapted to be secured to the adjacent edges of correspondingly elongated fastener tapes by stitches looped over both the rib portions of the strips which extend between the fastener elements thereof and said rib portions of the strips which extend between each two adjacent fastener lengths thereof.

References Cited in the file of this patent

UNITED STATES PATENTS

| | | |
|---|---|---|
| 2,262,881 | Boenecke | Nov. 18, 1941 |
| 2,470,251 | Kolbert | May 17, 1949 |
| 2,497,821 | Kohler | Feb. 14, 1950 |
| 2,708,968 | Soave | May 24, 1955 |
| 2,987,809 | Burbank | June 13, 1961 |